March 14, 1967    I. R. SHERMAN    3,309,151
GAS BEARING
Filed Feb. 5, 1965      3 Sheets-Sheet 1
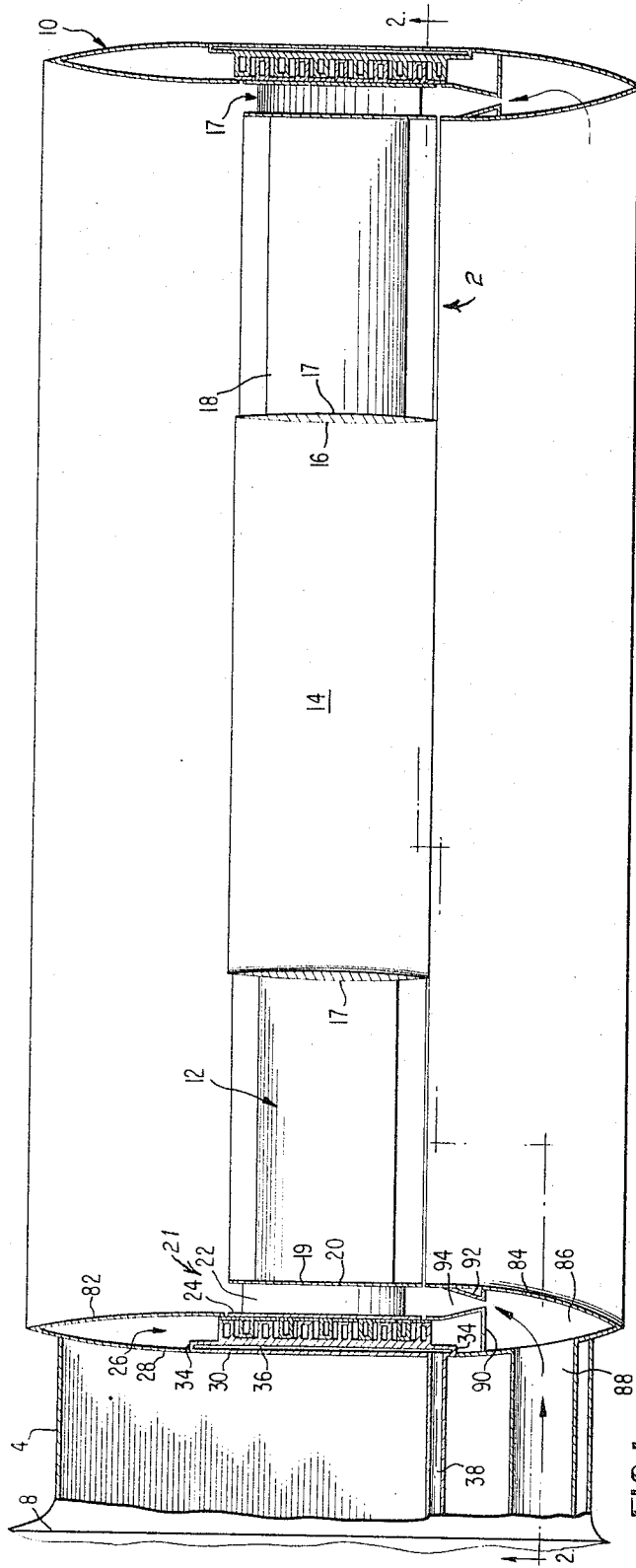
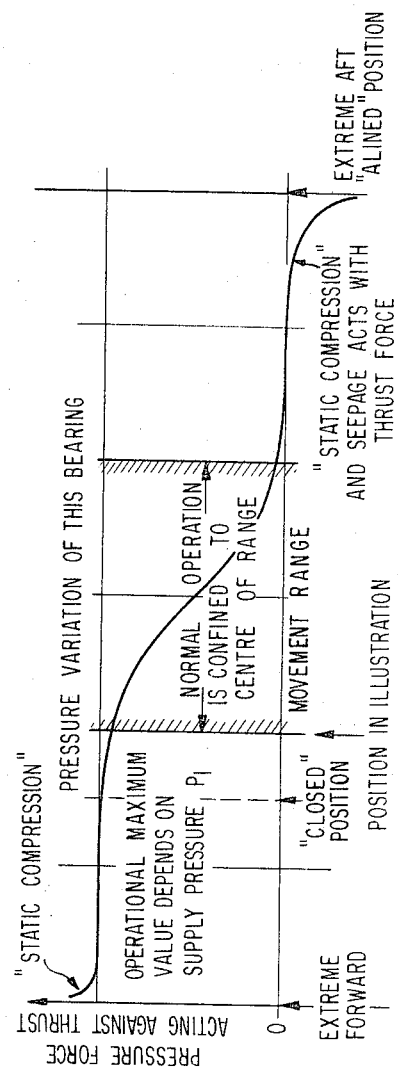
INVENTOR
IRVING R. SHERMAN
BY *James H. Littlepage*
ATTORNEY

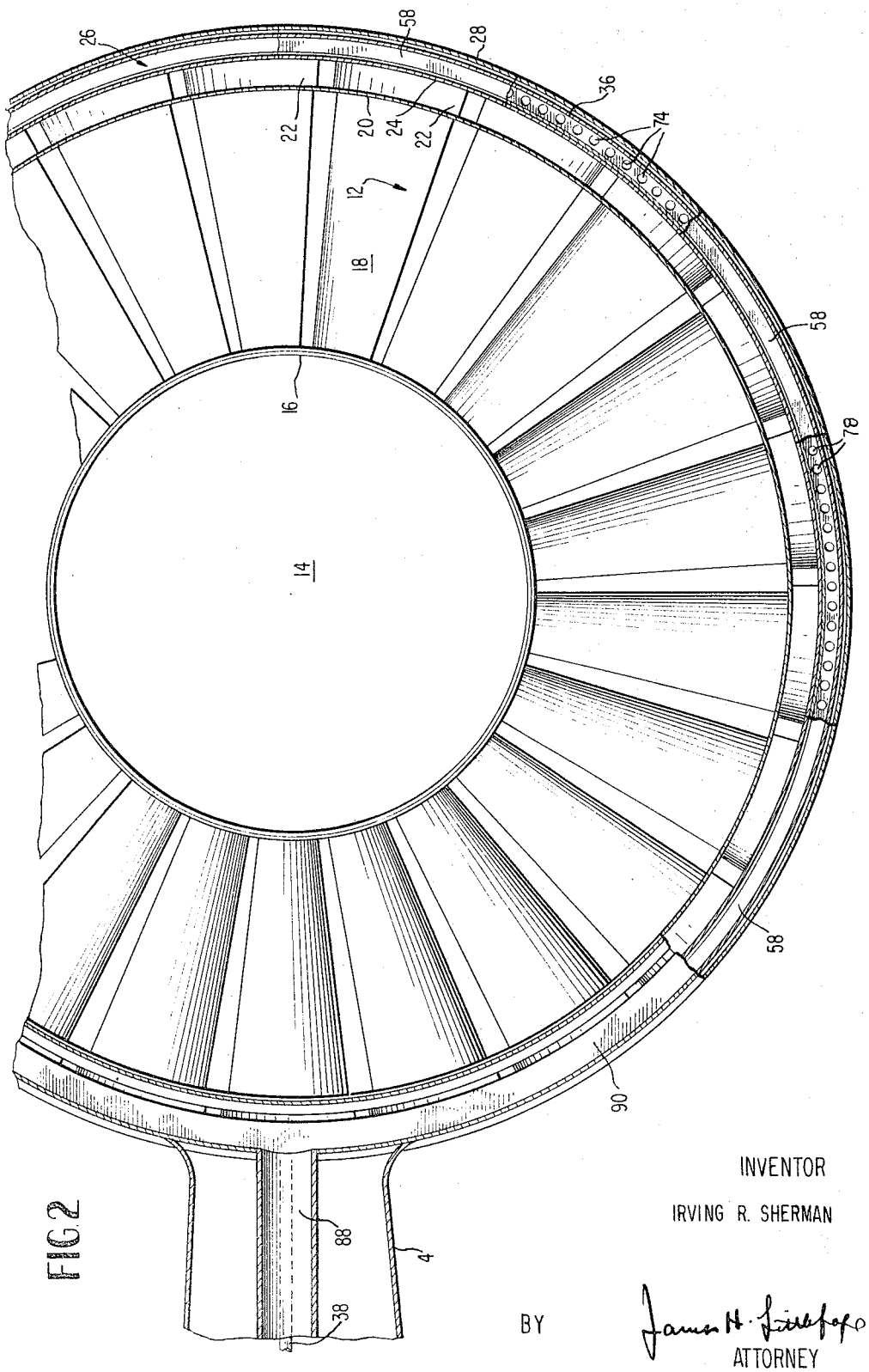

March 14, 1967  I. R. SHERMAN  3,309,151
GAS BEARING
Filed Feb. 5, 1965  3 Sheets-Sheet 3
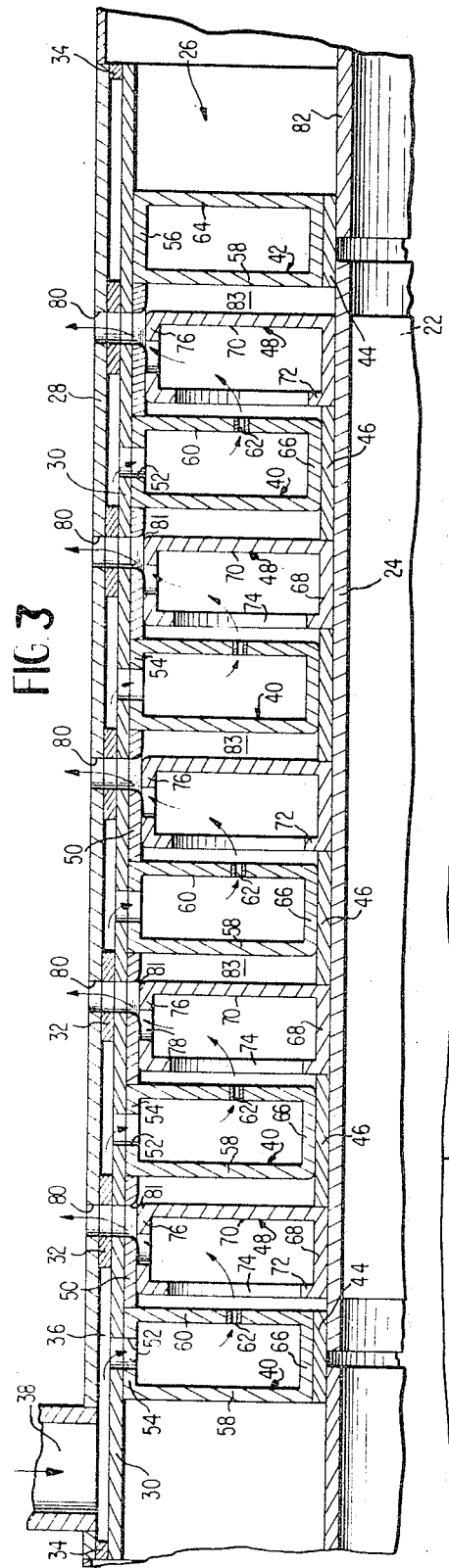
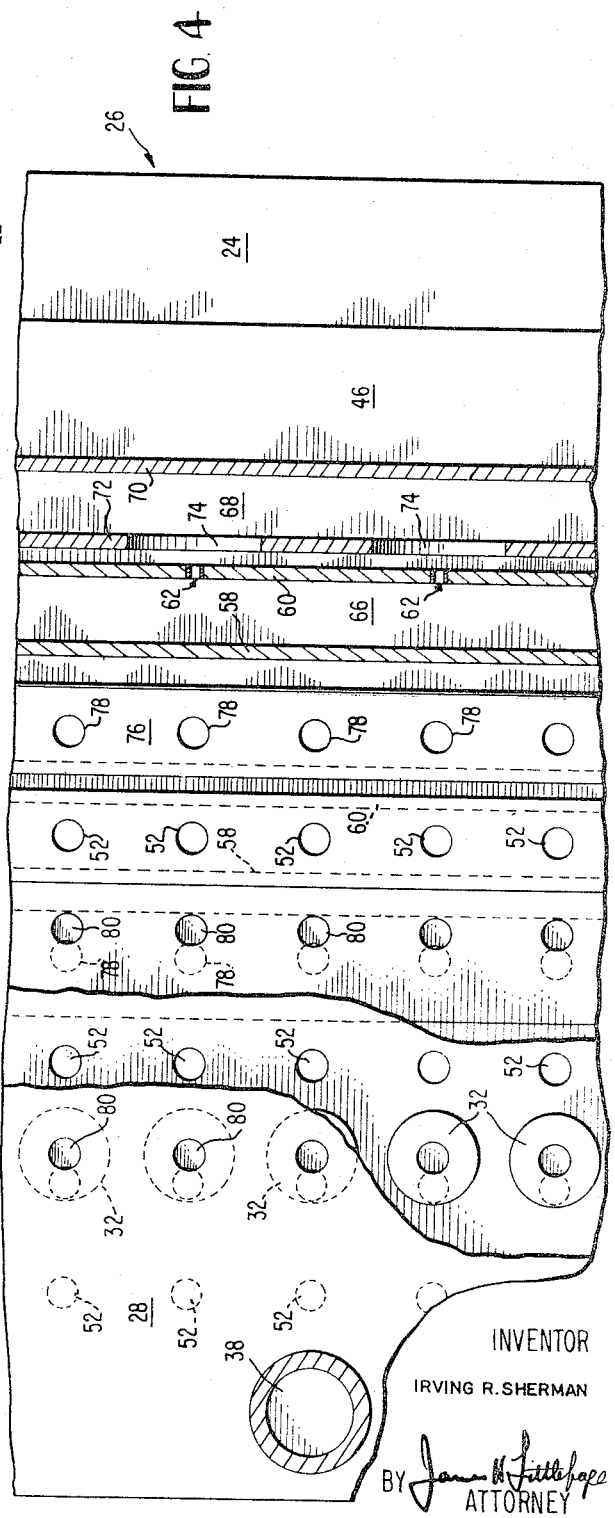
INVENTOR
IRVING R. SHERMAN
BY James B. Littlepage
ATTORNEY United States Patent Office 3,309,151
Patented Mar. 14, 1967

3,309,151
GAS BEARING
Irving R. Sherman, 131 Magazine St.,
Cambridge, Mass. 02139
Filed Feb. 5, 1965, Ser. No. 430,582
5 Claims. (Cl. 308—9)

This invention relates to gas bearings for withstanding both radial and axial thrusts between rotating members. Typical utility for the bearings of the type herein disclosed is shown in related applications filed concurrently herewith entitled, Bypass Core Ducted Fan With Outer Peripheral Bearing and Bypass Core Ducted Fan With Inner and Outer Peripheral Bearings.

In the design of the subject gas bearing, it is contemplated, first, that the axial thrust loads imposed thereon shall normally greatly exceed the radial thrust loads. This is the case where the bearing is used for rotatably supporting a ducted fan in an aircraft wherein the greater thrust, by far, is in the axial direction of the fan when the fan is driving the aircraft. To this end it is intended that the subject bearing shall be essentially of the pneumatic or gas type insofar as concerns axial thrust. In an aircraft, for which this bearing was originally designed, the pressure gas upon which the bearing depends for withstanding its normally high axial thrust loads is usually derived from a compressor, or it may be bled off from a jet. In any event, it is contemplated that there may be instances when the fan is rotating, such as during start-up or shut-down of the source of power from which the bearing normally derives its pressure gas, and during such times the bearing will be loaded, however lightly, primarily in the radial directions. It is therefore an object to provide a gas bearing having also good mechanical radial bearing characteristics which come into play when the gas pressure is reduced or cut off so that the bearing will not seize, even in the absence of pressure gas.

The specific object of this invention is to provide a gas bearing utilizing a series of pairs of axially-spaced concentric bands of material, one member of each pair being on a rotating member and the other member of each pair being on a supporting member, providing good mechanical bearing surfaces capable of bearing radial thrust loads even without a layer of gas therebetween interspersed between interdigitating sets of annular hollow fin-like members, one set being on the rotating member and the other set being on the supporting member, and a pneumatic system tending to maintain one set of the fins centered, in the axial direction, between the other set for bearing radial thrust loads.

These and other objects will be apparent from the following specification and drawings, in which:

FIG. 1 is a horizontal cross-sectional view showing the gas bearing in typical environment, i.e., rotatably supporting the outer periphery of a turbine-driven ducted fan;

FIG 2 is a vertical cross-section along the line 2—2 of FIG. 1;

FIG. 3 is an enlarged cross-sectional view taken axially through the gas bearing;

FIG. 4 is a "peeled away" view illustrating the arrangement of the openings and gas passages shown in FIG. 4; and, FIG. 5 is a graph showing the axial thrust operating characteristics of the bearing.

Referring now to the drawings, in which like reference numerals denote similar elements, FIGS. 1 and 2 show a typical mode for utilizing the gas bearing 26 for mounting a bypass core ducted fan 2. Ducted fan 2 is mounted at the outer end of stub wing 4 near the tail of an aircraft 8. Ducted fan 2 includes an outer duct 10 in which both the turbine 21 and the subject gas bearing 26 are housed, and fan units 12 which surround hollow bypass cores 14. The turbine which surrounds the fan unit 12 is powered by hot gases derived from a hot gas generator, such as a jet engine (not shown). The turbine is supported at its outer periphery by gas bearing 26, which preferably receives gas or air under pressure derived from the hot gas generator in the aircraft. For example, if a jet engine is used to generate the hot gases, air under pressure could be bled off from the compressor. The supply of hot gases and air under pressure for propulsion and gas bearings is well known to those skilled in this art.

Surrounding and secured to the outer ends 19 of fan blades 18 is the base ring 20 of a turbine 21, which includes an annular series of blades or buckets 22 whose outer ends are affixed to an outer ring 24 and the latter is rotatably supported in the outer wall 28 of outer duct 10 by a suitable bearing, such as gas bearing 26.

A bearing wall 30 is supported inwardly spaced from outer wall 28 by spacer washers 32 and at its forward and rear ends, by end seal rings 34. Outer wall 28, bearing wall 30 and end seal rings 34 define an annular chamber 36 into which duct 38 leads. Duct 38 is supplied with air or other gas under pressure from a suitable source of supply, such as a compressor. Affixed on the inner side of bearing wall 30 are a series of axially spaced inwardly projecting annular hollow fins 40 and 42. Affixed to the inner sides of the inner walls 66 of the forward and rear stationary fins 40 and 42 are bearing bands 44, and around the intermediate portion of turbine outer ring 24 are axially spaced bearing bands 46. Assuming fins 40 and 42 are made of ferrous metal, bearing bands 44 and 46 should be made of bearing metal such as oil impregnated bronze, to insure against seizing. Affixed around the outer side of turbine outer ring 24 are a series of axially spaced outwardly projecting annular hollow fins 48 which slidingly engage bearing bands 50. As with the previously described fins and bearing bands, they should be made of dissimilar metals having a low coefficient of friction so that even without the benefit of the pressure gas described below, a good oil lubricated bearing is provided.

The pneumatic arrangement provides a gas bearing as follows. Leading from annular chamber 36 into the interiors of hollow fins 40 are annular series of inlet holes 52 which pass through the outer wall 52 of hollow fins 40. The outer wall 56 of hollow fin 42 is blank and its interior takes no part in the pneumatic system. The front walls 58 of hollow fins 40 and 42 are blank, but the rear walls 60 of hollow fins 40 are each provided with an annular series of restricted orifices 62. The inner walls 66 of hollow fins 40 and 42 are blank. Thus, each hollow fin 40 constitutes a plenum chamber supplied by gas under pressure through inlet holes 52. The rear wall 64 of hollow fin 42 is blank and plays no part in the pneumatics.

In the pneumatic system, hollow fins 48 function essentially as valved pistons. Their inner walls 68 are blank, as are their rear walls 70. However, their front walls 72 are each provided with an annular series of diametrically spaced large openings 74, and their radially outward walls 76 are provided with an annular series of circumferentially spaced outlet ports 78. When the outer ring 24 of turbine 21 moves rearwardly with respect to bearing wall 30 to the position shown in FIG. 4, outlet ports 78 communicate with the atmosphere via annular series of outlets 80 which pass through bearing wall 30, spacer washers 32 and the outer wall 38 of the outer duct 10.

When the outer ring 24 of turbine 21 moves forwardly of the position shown in FIG. 4, outlet ports 78 are blanked by the surfaces of bearing bands 50 so that, except for the leakage between the rubbing surfaces of the hollow fins and the bearing bands, the gas issuing rearwardly via restricted orifices has no escape route, and gas pressure builds up against the forwardly facing surfaces 70 of hollow fins 48, thereby forcing the latter, piston-like, to the rear. As soon as the outer ring 24 of turbine 21 and the hollow fins 48 thereon move rearwardly enough to open connecting cracks between outlet ports 78 and outlets 80, the gas pressure which formerly forced hollow fins 48 rearwardly is relieved. Thereupon, when the outer rear corners 81 of hollow fins 48 move rearwardly beyond the rear edges of outlets 80, air is trapped in the then closed chamber 83 between the rear walls 70 of hollow fins 48 and the front walls 58 of hollow rings 40, and thus further rearward movement of the outer turbine ring 24 relative to bearing walls 30 is pneumatically resisted. The air leaking between the rubbing surfaces of the hollow fins and bearing rings provides a cushion and holds the rubbing surfaces apart sufficiently so that there is little friction in the radial direction of the bearing, and the piston-like action of the hollow fins provides a pneumatic, nearly friction-free axial bearing for the turbine and fan.

The subject bearing may be classed as an aerostatic bearing in that it does not depend upon rotation of the bearing to produce centering forces. Even though the bearing be stationary, as soon as pressure air is fed in, it serves as "jacking gas" to center the bearing radially.

FIG. 5 shows the axial thrust operating characteristics of the bearing. In the illustrated use, the axial thrust of the fan, when the latter is operating, will always be in the direction tending to move fins 48 to the left, as seen in FIG. 4. The force of the air against the forwardly or leftward-facing surfaces of fins 48 will maintain them generally centered between fins 40, with the outer peripheral surfaces of fins 48 (the portions thereof to the right of posts 50) shunting back and forth across outlets 80 and coming to rest at an equilibrium position such that gas pressure against walls 70 is equal to axial thrust force. For a properly sized bearing the equilibrium position will be within normal operation range shown in FIG. 5.

The invention is not limited to the details of the structure disclosed and described herein, but is intended to cover all substitutions, modifications and equivalents within the scope of the following claims.

I claim:

1. A gas bearing for withstanding axial thrust normally in one direction comprising a fixed member having peripheral cylindrical surface means, a rotating member having peripheral cylindrical surface means coaxial with and radially spaced from the peripheral cylindrical surface means on the fixed member, a series of axially spaced annular hollow fins on each member extending radially towards the cylindrical surface means on the other member, each of said fins having a base wall affixed to its respective member, axially-spaced radially-extending side walls affixed to said base wall, and a cylindrical free end wall affixed to said side walls and disposed close to the peripheral cylindrical surface means on the other member, the fins on the rotating member being axially spaced and interdigitating between the fins on the fixed member whereby to provide chambers defined between opposite side walls of the fins and the peripheral surface means on said members, means for supplying gas under pressure to the hollow interiors of the fins on the fixed member save for a last one of the series, an annular series of restricted orifices through those side walls of the fins on the fixed members, save for said last of the series, which face counter the normal direction of thrust, the other side walls of the last-named fins being blank, those side walls of the fins on the rotating member facing in the direction of thrust having an annular series of openings therein larger than said restricted orifices, the other side walls of the last-named fins axially intermediate portions of the free end walls of the fins on the rotating member each having an annular series of ports therethrough, that portion of each free end wall of the last-named fins which is disposed between said ports and that side which faces counter to the normal direction of thrust being blank, the peripheral cylindrical surface means on said fixed member having axially spaced annular rows of angularly spaced outlets therethrough communicating with the atmosphere, the arrangement of said ports and blank portions on the free end walls of the fins on the rotating member and said outlets being such that said blank portions move across said outlets upon axial movement of the rotating member, relative to the fixed member, in the direction of thrust and said ports move across said outlets upon movement of the rotating member relative to the fixed member counter to the direction of thrust.

2. The combination claimed in claim 2, said cylindrical surface means on each member including oil impregnated bearing rings slidingly supporting the free end walls of the fins on the other member.

3. The combination claimed in claim 2, the interfaces between at least some of the bearing rings and the free end walls of the fins providing air leak paths from said chambers to the atmosphere via said outlets.

4. The combination claimed in claim 3, the means for supplying gas under pressure to the hollow interiors of the fins on the fixed member comprising a cylindrical manifold and conduits connecting the manifold with the hollow interiors of the last-named fins save for said last one of the series.

5. In a gas bearing, a first member having a cylindrical outer periphery, a second member having a cylindrical inner periphery coaxial with and radially spaced from the outer periphery of the first member, one of said members being rotatable with respect to the other, a series of axially spaced annular fins projecting radially from the periphery of each member, the fins on each member having annular free end portions in loose sliding seal engagement with the cylindrical periphery of the other member, the fins on one member interdigitating between the fins on the other member and defining substantially closed chambers therebetween, means for introducing gas under pressure into the chambers between alternate pairs of said fins, and means responsive to relative axial movement between said members for venting said gas from said chambers to the atmosphere.

References Cited by the Examiner
UNITED STATES PATENTS
957,797  5/1910  Parsons et al. _____ 308—162

MARTIN P. SCHWADRON, *Primary Examiner.*

F. SUSKO, *Assistant Examiner.*